June 24, 1958 S. E. BATES 2,839,820
BRAKE SHOE SPRING TOOL
Filed Nov. 14, 1956
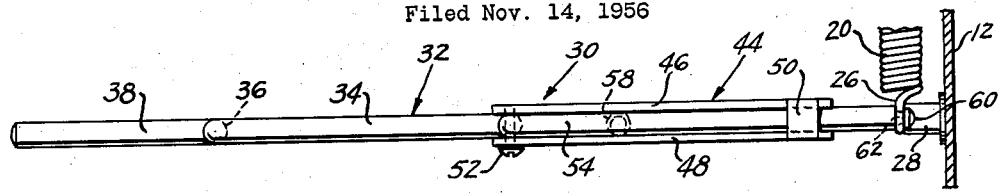
FIG. 2
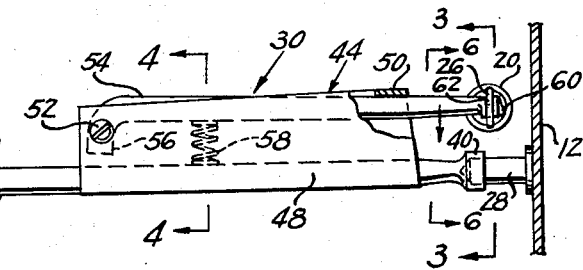
FIG. 1
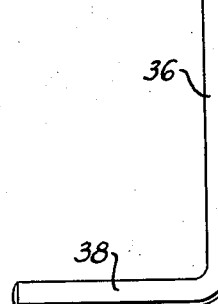
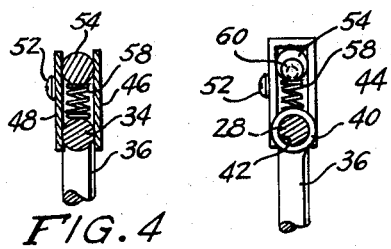
FIG. 3
FIG. 4
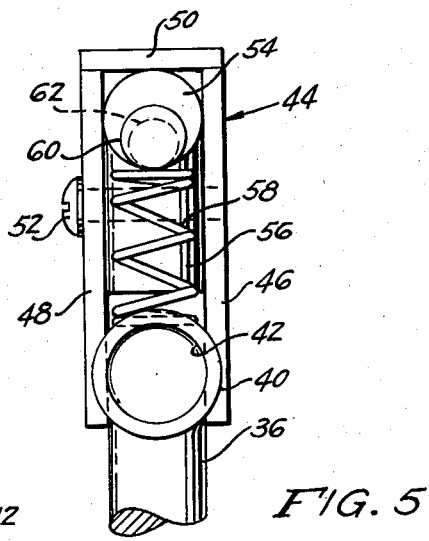
FIG. 5
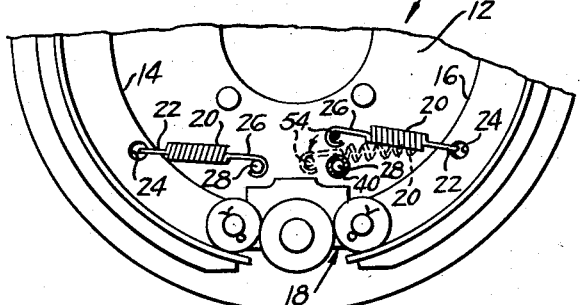
FIG. 6
INVENTOR.
SAMUEL E. BATES
BY
McMorrow, Berman + Davidson
ATTORNEYS

United States Patent Office 2,839,820
Patented June 24, 1958

2,839,820

BRAKE SHOE SPRING TOOL

Samuel E. Bates, Texarkana, Tex.

Application November 14, 1956, Serial No. 622,211

3 Claims. (Cl. 29—227)

This invention relates generally to hand tools and is more particularly directed to a novel brake shoe spring tool for the purpose of tensionally mounting a tension spring between a brake shoe and a laterally extending anchor pin on a backing plate of a wheel brake assembly.

Wheel brake assemblies which conventionally incorporate a pair of oppositely disposed pivotal brake shoes urged into engagement with the rotor of a wheel brake assembly generally incorporate tension or return springs which are tensionally disposed between a laterally extending anchor pin mounted on a backing plate which function to return the brake shoes out of engagement with the rotor after the same had been moved outwardly during a brake application by means of a wheel cylinder of a conventional hydraulic brake system, for example. The mounting of the aforementioned tension springs when assembling a wheel brake assembly of the character involved has heretofore proved unnecessarily time consuming and awkward.

A primary object of invention is to provide a novel tool facilitating the ready mounting and removal of brake springs between a brake shoe and anchor pin of a wheel brake assembly.

A more specific object of invention in conformance with that set forth is to provide a novel brake shoe tool in conformance with that set forth which includes a crank including an elongated shaft rotatable about the longitudinal axis of an anchor pin upon which a tension spring is to be mounted, said shaft incorporating an elongated rod pivoted transversely thereon at one end and being spring urged away from the longitudinal axis of said shaft, said rod including a terminal end portion extending beyond the terminal end of the shaft and rotatable in a plane intersecting an intermediate portion of an anchor pin upon which the shaft is being rotated, the terminal end of the rod facilitating thereon the hook-end portion of a tension spring permitting the ready disposal or removal thereof on the intermediate portion of the anchor pin.

And yet a further object of invention in conformance with that set forth is to provide a novel brake shoe spring tool of the character involved which is readily and expeditiously manufactured, easily used, and highly satisfactory, practical and efficient for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a side elevation view of the novel brake shoe spring tool, showing a fragmentary portion of a wheel brake backing plate together with an anchor pin extending laterally therefrom relative to the end portion of a tension spring to be mounted on said anchor pin;

Figure 2 is a top plan view of Figure 1;

Figure 3 is a vertical section view taken substantially on line 3—3 of Figure 1;

Figure 4 is a vertical section view taken substantially on line 4—4 of Figure 1;

Figure 5 is an enlarged fragmentary end view of the novel tool looking from right to left at Figure 1, the tool having been removed from the portions of the wheel brake assembly with which it cooperates; and Figure 6 is a fragmentary face view, on a somewhat reduced scale, taken substantially on line 6—6 of Figure 1, showing basic components of the wheel brake assembly, and illustrating the manner in which the tension spring will be disposed on an anchor pin of the wheel brake assembly.

Referring to the drawing in detail, and first considering Figure 6, a fragmentary portion of a conventional wheel brake assembly is indicated generally at 10, said wheel brake assembly including a backing plate 12 which has pivotally supported thereon in any suitable manner a pair of oppositely disposed brake shoes 14 and 16 which may be urged away from each other in the conventional manner by means of a wheel cylinder indicated generally at 18 operatively connected in the hydraulic brake system, for example. After the brake shoes 14 and 16 have been extended away from each other, and it is no longer necessary to apply the brakes of a vehicle, they are returned to a nonbraking position by means of tension springs 20 which include one hook-end portion 22 extending through a suitable aperture 24 of the brake shoes, the other end 26 of said springs being engageable over an intermediate portion of laterally extending anchor pins 28 suitably secured in spaced relationship from the shoes 14 and 16 on the backing plate 12.

The heretofore described structure is conventional and although a specific wheel brake assembly has been shown, it is to be understood that the novel brake shoe spring tool may be readily utilized for other wheel brake assemblies incorporating comparable similar operating structures.

The novel brake shoe spring tool is indicated generally at 30, said tool comprising a crank 32 constructed from any suitable material, a single integral rod, for example, and including a shaft 34, an angularly related lever portion 36 and a handle 38. The terminal end 40 of the shaft comprises a longitudinally opening socket 42 rotatably received on the end portion of an anchoring pin 28 and accordingly by manipulating the handle 38 in the manner indicated by the arcuate direction arrow of Figure 1, the shaft 34 of the crank may be rotated about the longitudinal axis of the anchor pin 28.

Suitably secured in laterally extending relationship to an intermediate portion of the shaft 34 in a direction opposite that which the lever 36 is directed, is a housing indicated generally at 44. The housing 44 conveniently comprises a pair of elongated mutually parallel plate elements 46 and 48 suitably secured at their lower edges on opposite sides of the shaft 34. Extending transversely of the upper edge of the plates 46 and 48 in suitably secured relationship on the end adjacent the terminal end of the shaft 34 is a suitable abutment such as a strap element 50 thus the housing 44 defines a longitudinally extending open slot portion opening toward the terminal end of the shaft 34. Extending transversely at intermediate rear end portions of the plates 46 and 48 is a suitable pivot shaft element 52 pivotally mounting thereon between the limits of the abutment 50 and the outer surface of the shaft 34 therebeneath an elongated rod 54 conveniently incorporating an angulated end portion 56 transversely apertured for receiving therethrough the element 52. Interposed between overlying intermediate portions of the shaft 34 and rod 54 is a suitably secured compression spring 58 urging the rod 54 away from the longitudinal axis of the shaft 34. The terminal end portion of the rod 54 as indicated at 60 extends beyond terminal end portion 40 of the shaft 34 and when rotated about the longitudinal axis of the anchor pin 28 defines a plane intersecting an intermediate portion of the pin 28. The terminal end 60 of the rod 54 incorporates thereon a hook portion 62 opening away from the shaft 34 and facilitating the retention of the hook-end portion 26 of a tension spring 20 thereon.

Considering Figure 6, the tension spring 20 has already been mounted between the aperture portion 24 of the brake shoe 14 and the anchor pin 28 and the backing plate 12. Considering the right hand portion of this figure, it is noted that the socket end or terminal end portion 40 of the shaft 34 is disposed on the anchor pin 28. The end portion of the rod 54 receives thereon the hook-end portion 26 of the spring 20, and by rotating the shaft 34 in a counterclockwise direction about the longitudinal axis of the anchor pin 28 spring 20 will be tensioned in the manner indicated by the phantom lines of Figure 6. When the tool has been rotated approximately ninety degrees, i. e. in this position the rod 54 will be in substantially planar alignment with the anchor pin 28, continued rotation of the tool will result in the hook-end portion 26 of the spring 20 being disposed about an intermediate portion of the anchor pin 28. Obviously, insertion of the rod 54 i. e. the hook-end portion thereof, within the hook-end portion 26 of the spring 20 and by counter rotating the tool the spring may be removed from the anchor pin 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A tool for tensionally mounting a tension spring between a brake shoe and a laterally extending anchor pin on a backing plate of a wheel brake assembly comprising a crank including an elongated shaft terminating in mounting means for rotatably disposing said shaft on an end portion of an anchor pin for rotation about the longitudinal axis thereof, a rod member pivotally supported on an intermediate portion of the shaft normal to the longitudinal axis of said shaft for movement toward and away from said shaft, and spring means interposed between the shaft and rod urging the rod away from the shaft, means on said shaft for engaging said arm to limit its pivotal movement to a position where the arm is normally substantially parallel to the shaft, the terminal end portion of the rod extending beyond the means on the shaft for rotatably disposing the shaft on said anchor pin permitting the terminal end portion of the rod to be rotated in a plane intersecting an intermediate portion of the anchor pin about which the shaft is rotated facilitating engagement of a hook-end portion of the tension spring to be drawn into alignment with the intermediate portion of the anchor pin and disposed on or removed from said anchor pin, said means for rotatably supporting the shaft on an anchor pin comprising a socket portion opening longitudinally of the terminal end of the shaft.

2. A tool for tensionally mounting a tension spring between a brake shoe and a laterally extending anchor pin on a backing plate of a wheel brake assembly comprising a crank including an elongated shaft terminating in mounting means for rotatably disposing said shaft on an end portion of an anchor pin for rotation about the longitudinal axis thereof, a rod member pivotally supported on an intermediate portion of the shaft normal to the longitudinal axis of said shaft for movement toward and away from said shaft, and spring means interposed between the shaft and rod urging the rod away from the shaft, means on said shaft for engaging said arm to limit its pivotal movement to a position where the arm is normally substantially parallel to the shaft, the terminal end portion of the rod extending beyond the means on the shaft for rotatably disposing the shaft on said anchor pin permitting the terminal end portion of the rod to be rotated in a plane intersecting an intermediate portion of the anchor pin about which the shaft is rotated facilitating engagement of a hook-end portion of the tension spring to be drawn into alignment with the intermediate portion of the anchor pin and disposed on or removed from said anchor pin, said means for rotatably supporting the shaft on an anchor pin comprising a socket portion opening longitudinally of the terminal end of the shaft, said spring means comprising a compression spring interposed between overlying intermediate portions of the shaft and rod.

3. A tool for tensionally mounting a tension spring between a brake shoe and a laterally extending anchor pin on a backing plate of a wheel brake assembly comprising a crank including an elongated shaft terminating in mounting means for rotatably disposing said shaft on an end portion of an anchor pin for rotation about the longitudinal axis thereof, a rod member pivotally supported on an intermediate portion of the shaft normal to the longitudinal axis of said shaft for movement toward and away from said shaft, and spring means interposed between the shaft and rod urging the rod away from the shaft, means on said shaft for engaging said arm to limit its pivotal movement to a position where the arm is normally substantially parallel to the shaft, the terminal end portion of the rod extending beyond the means on the shaft for rotatably disposing the shaft on said anchor pin permitting the terminal end portion of the rod to be rotated in a plane intersecting an intermediate portion of the anchor pin about which the shaft is rotated facilitating engagement of a hook-end portion of the tension spring to be drawn into alignment with the intermediate portion of the anchor pin and disposed on or removed from said anchor pin, said means for rotatably supporting the shaft on an anchor pin comprising a socket portion opening longitudinally of the terminal end of the shaft, the end portion of the rod comprising an integral hook portion facilitating retention of a hook-end portion of a tension spring thereon.

References Cited in the file of this patent

UNITED STATES PATENTS

| | | |
|---|---|---|
| 1,843,866 | Chapman | Feb. 2, 1932 |
| 2,274,981 | Grubb | Mar. 3, 1942 |
| 2,606,226 | Matyas et al. | Aug. 5, 1952 |
| 2,666,256 | White | Jan. 9, 1954 |